(12) United States Patent
Froissard

(10) Patent No.: US 6,910,767 B2
(45) Date of Patent: Jun. 28, 2005

(54) SIDE SHIELD FOR EYEGLASSES WITH SPRING-HINGE TEMPLE BAR

(75) Inventor: Laurent Froissard, Cranston, RI (US)

(73) Assignee: Bacou-Dalloz Eye & Face Protecrion, Inc., Smithfield, RI (US)

( * ) Notice: Subject to any disclaimer, the term of this patent is extended or adjusted under 35 U.S.C. 154(b) by 0 days.

(21) Appl. No.: 10/960,207

(22) Filed: Oct. 7, 2004

(65) Prior Publication Data

US 2005/0078268 A1 Apr. 14, 2005

Related U.S. Application Data

(60) Provisional application No. 60/510,814, filed on Oct. 14, 2003.

(51) Int. Cl.[7] .............................. G02C 7/10; A61F 9/04
(52) U.S. Cl. .................................... 351/44; 2/13; 2/449
(58) Field of Search ............................ 351/41, 44, 158; 2/13, 448, 449, 450, 451

(56) References Cited

U.S. PATENT DOCUMENTS

| | | | |
|---|---|---|---|
| 2,900,639 A | 8/1959 | Lindstrom | 2/13 |
| 5,394,567 A * | 3/1995 | Vatterott | 2/449 |
| 5,438,706 A | 8/1995 | Lambur | 2/13 |
| 5,543,864 A | 8/1996 | Hirschman et al. | 351/47 |
| 5,548,351 A | 8/1996 | Hirschman et al. | 351/47 |
| 5,608,469 A | 3/1997 | Bolle | 351/44 |
| 5,748,278 A | 5/1998 | Simmons, Sr. | 351/44 |
| 5,798,815 A | 8/1998 | Hirschman et al. | 351/44 |
| 5,940,161 A | 8/1999 | Hirschman et al. | 351/44 |
| 6,007,196 A | 12/1999 | Saba et al. | 351/44 |
| 6,270,216 B1 | 8/2001 | DiChiara | 351/44 |
| RE37,530 E | 1/2002 | Hirschman et al. | 351/44 |
| 6,393,609 B1 | 5/2002 | Simmons, Sr. | 2/13 |
| 6,540,347 B1 | 4/2003 | Radziwon et al. | 351/44 |
| 6,715,873 B2 * | 4/2004 | Nahmias | 351/44 |

* cited by examiner

Primary Examiner—Hung Xuan Dang
(74) Attorney, Agent, or Firm—Barlow, Josephs & Holmes Ltd.

(57) ABSTRACT

A side shield for eyeglasses with a spring-hinge temple bar comprising a side wall having a rear edge, front edge, and inside surface. The side shield has a relief structure extending forwardly from the rear edge of the side shield. A fastening structure is located on the relief structure towards the rear edge of the side shield, the fastening structure securing the relief structure to the temple bar of the eyeglasses. The relief structure allows outward deflection of the spring-hinge temple bar when biased outwardly without significantly displacing the side shield from its normal assembled position.

17 Claims, 12 Drawing Sheets

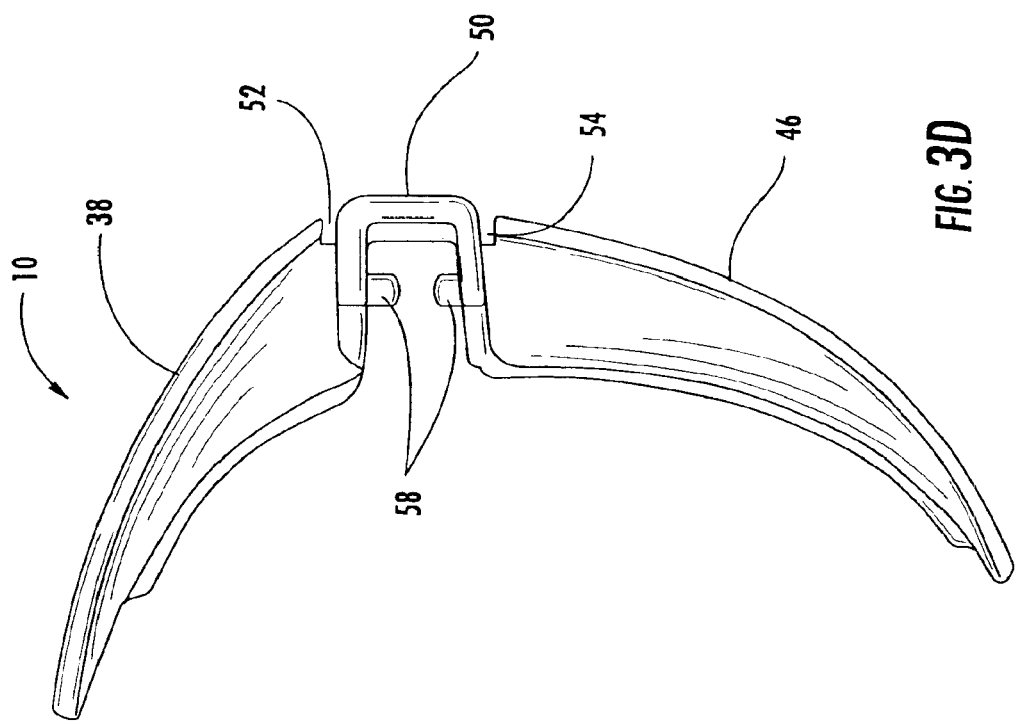

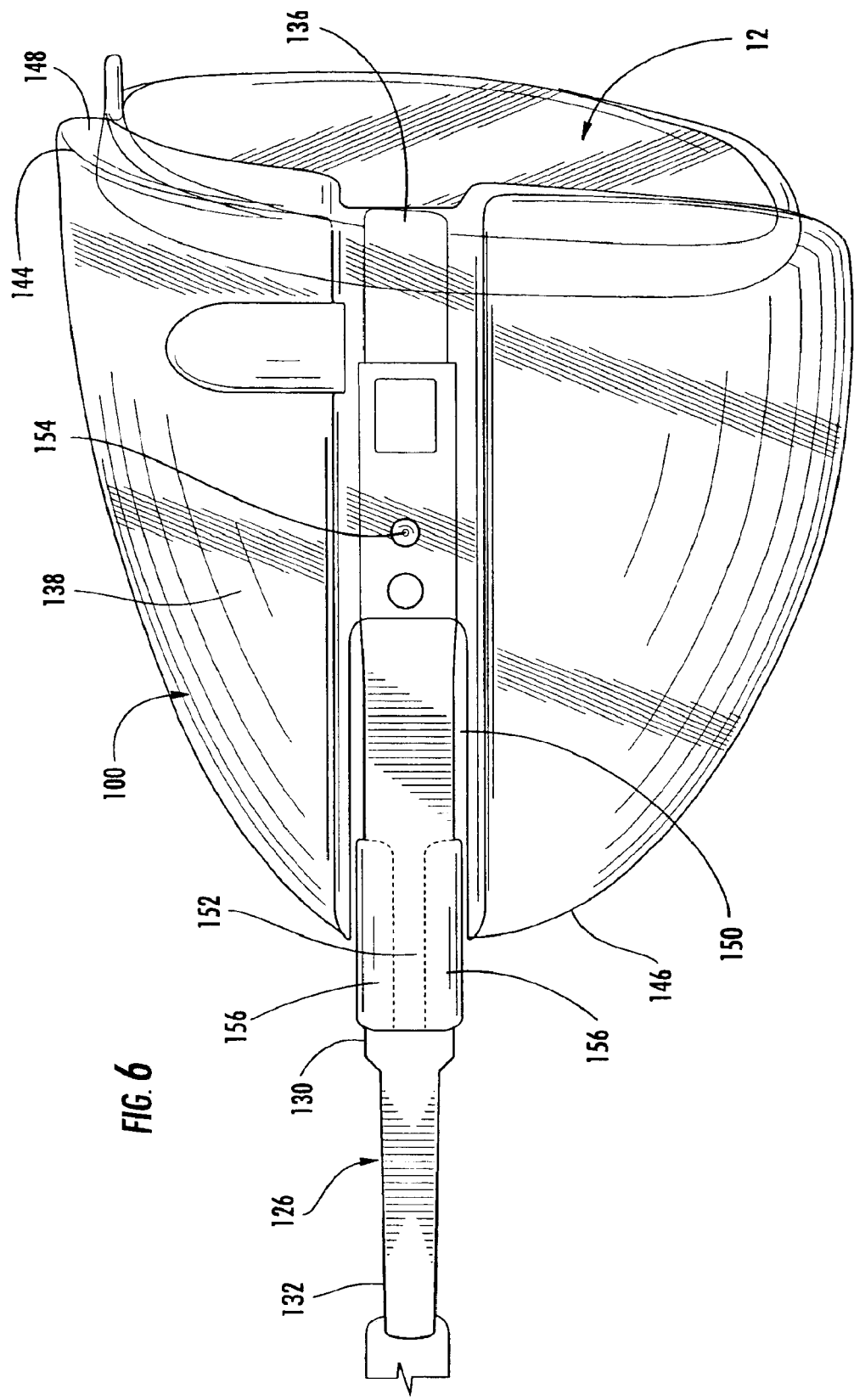

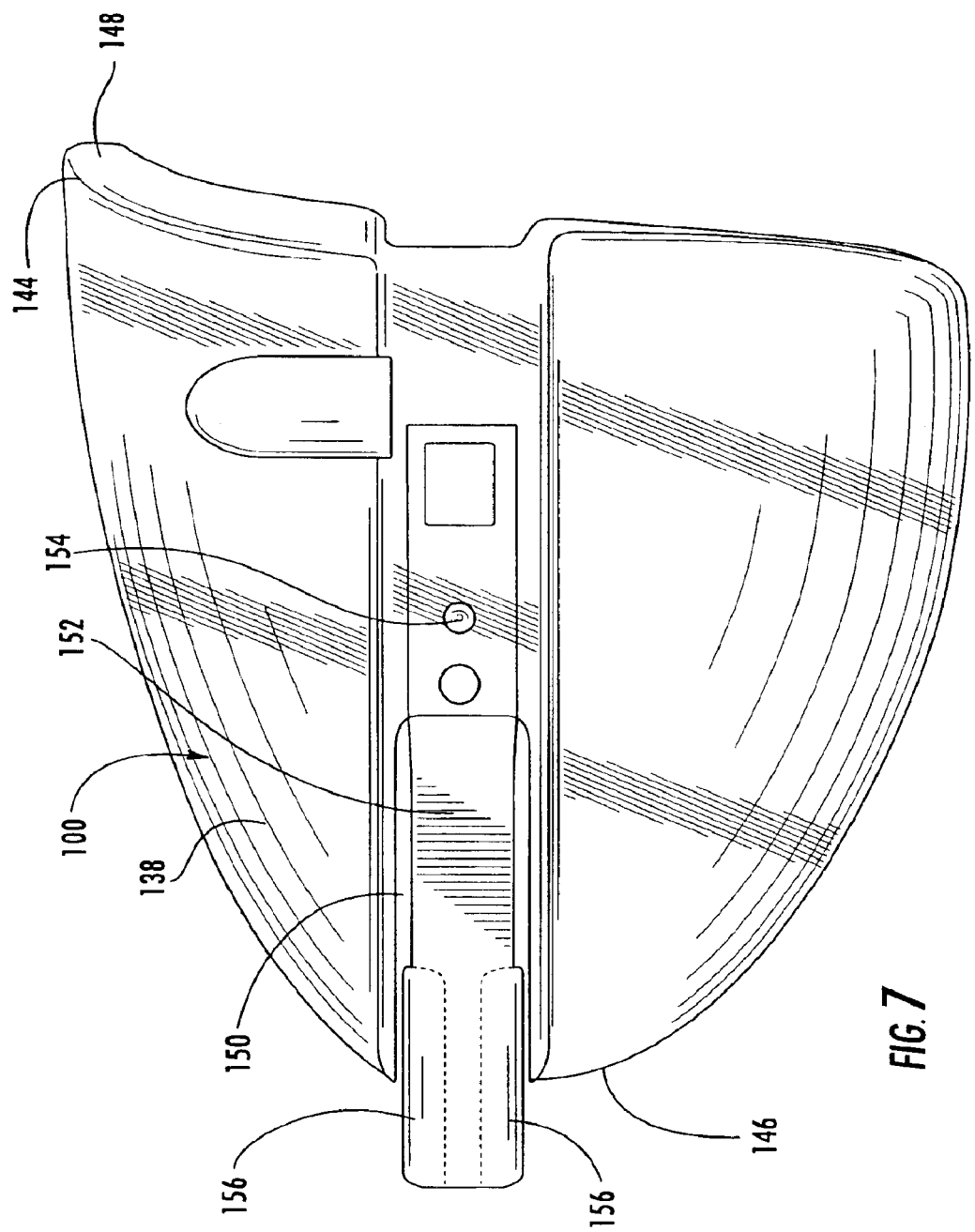

SIDE SHIELD FOR EYEGLASSES WITH SPRING-HINGE TEMPLE BAR

CROSS-REFERENCE TO RELATED APPLICATIONS

This application is related to and claims priority from earlier filed U.S. Provisional Patent Application No. 60/510,814, filed Oct. 14, 2003, the contents of which are incorporated herein by reference.

BACKGROUND

Eyeglasses having spring-hinge temple bars have been known in the art for quite some time. The spring-hinge temple bars reduce pressure on the wearers temples and generally provide a more flexible fit for the wearer.

Side safety shields for eyeglasses have also been known in the art for quite some time. The side shields typically attach to the temple bars of the eyeglasses to provide side eye protection. Once the side shields are attached to the temple bars they are designed to pivot with the temple bars as they fold inwardly for storage.

However, one issue that has not been adequately addressed in the art is outward pivoting movement of the side shields in eyeglasses having spring-hinge temple bars. While the spring hinges have a limited range of movement, outwardly flexing of the spring hinges causes a significant movement of the side shield which has been found to create gaps at the front edge of the side shield and thus reduce the level of protection.

It would be therefore advantageous to have a side shield which has been designed to provide a limited degree of outward deflection to absorb the movement of the spring hinges of such eyeglasses.

SUMMARY

The instant invention relates to safety glasses, and more particularly to safety side shields for use with eyeglasses having a spring-hinge temple bar that satisfies the need for a side shield that allows limited deflection of the temple bars without reducing the level of protection afforded.

The instant invention provides such a side shield design wherein the side wall of the side shield is provided with a relief structure to permit outward movement of the temple bar without significant movement of the primary side shield structure.

In a first embodiment, the side wall of the side shield is provided with two parallel slots extending forwardly from the rear edge of the side wall and adjacent to the upper and lower edges of the temple bar to form a flexible tab with which can deflect outwardly during outward movement of the temple bars. The flexible tab is secured to the temple bar of the safety glasses by channel formations on the inside surface of the terminal end of the flexible tab. The temple bar is received within the channel to maintain the side shield in assembled relation with the temple bar.

In a second embodiment, a large slot, greater than the width of the temple bar extends forwardly from the rear edge of the side wall to provide a relief opening in which the temple bar can move. A flexible spring clip, extending parallel to the temple bar is mounted to the side wall of the side shield and extends rearwardly, filling the relief opening created by the slot. The rear terminal end of the spring clip includes a channel formation into which the temple bar is received to mount the side shield to the glasses.

Accordingly, among the objects of the instant invention are: the provision of a side shield including a relief structure which allows a spring-hinge temple bar to flex outwardly without displacing the side shield from its normal assembled position.

DESCRIPTION OF THE DRAWINGS

These and other features, aspects, and advantages of the present invention will become better understood with regard to the following description, appended claims, and accompanying drawings where:

(6) FIG. 3D is a rear view of the side shield;

(11) FIG. 6 is a side view of a second embodiment of the invention wherein the side wall of the side shield includes a large relief opening and a flexible spring clip mounted in the relied opening; and

(12) FIG. 7 is another side view thereof without the eyeglasses assembled.

DESCRIPTION

Figure 1:
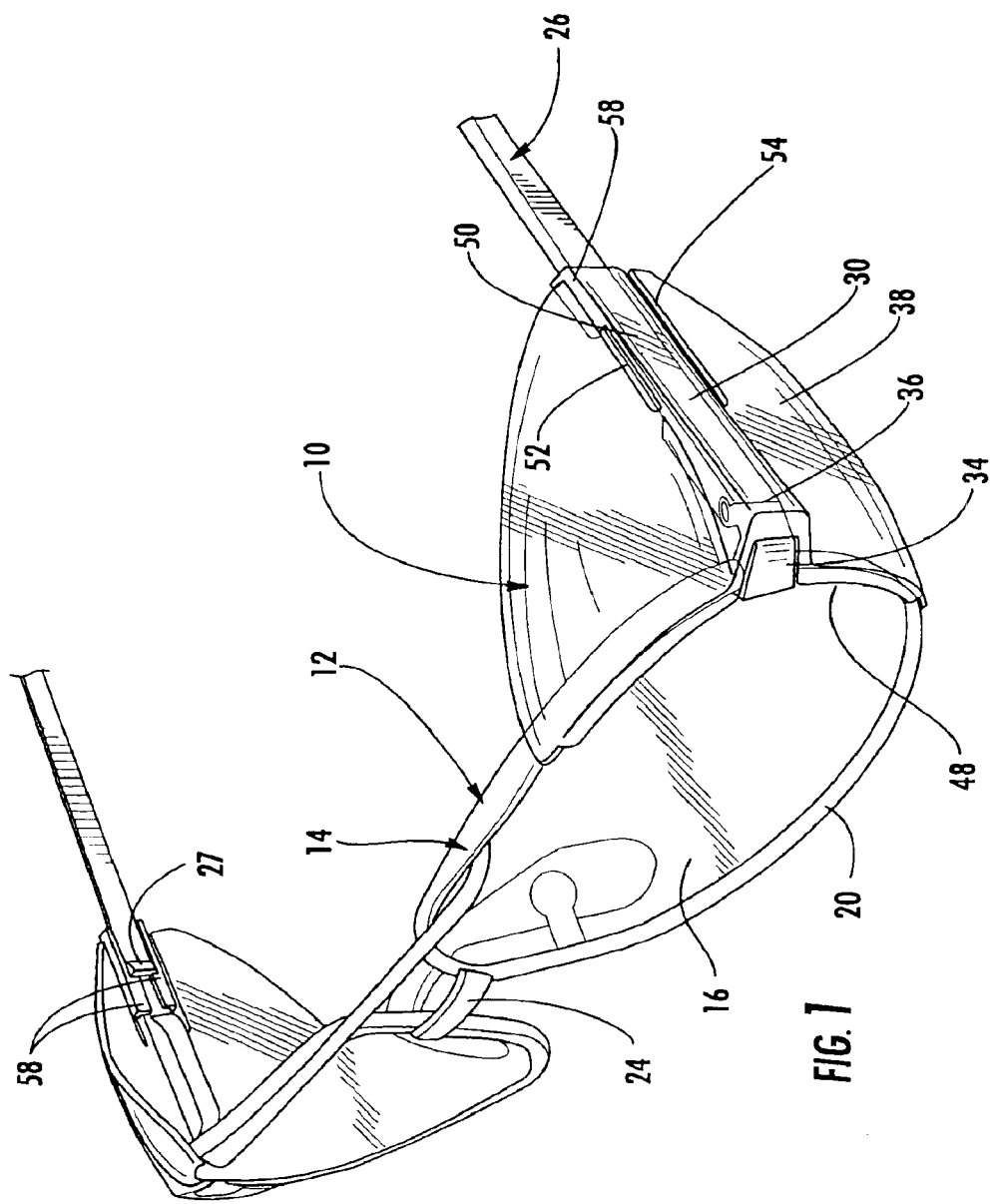
FIG. 1 is a perspective view of a first embodiment of the invention wherein the side wall of the side shield includes two relief slots to provide a flexible living hinge.
Figure 2:
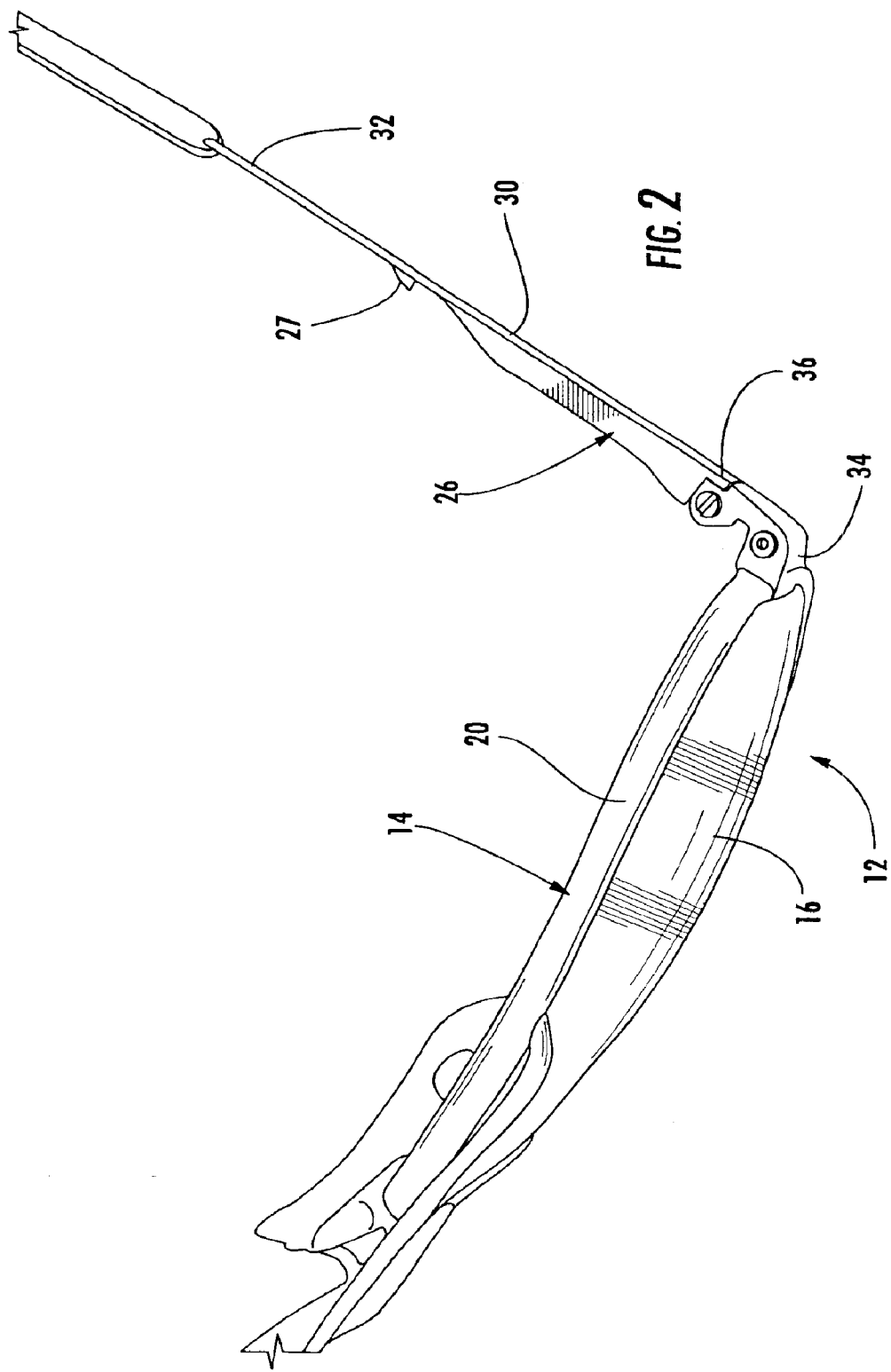
FIG. 2 is a perspective view of a pair of eyeglasses having a spring-hinge temple bar.
Figure 3A:
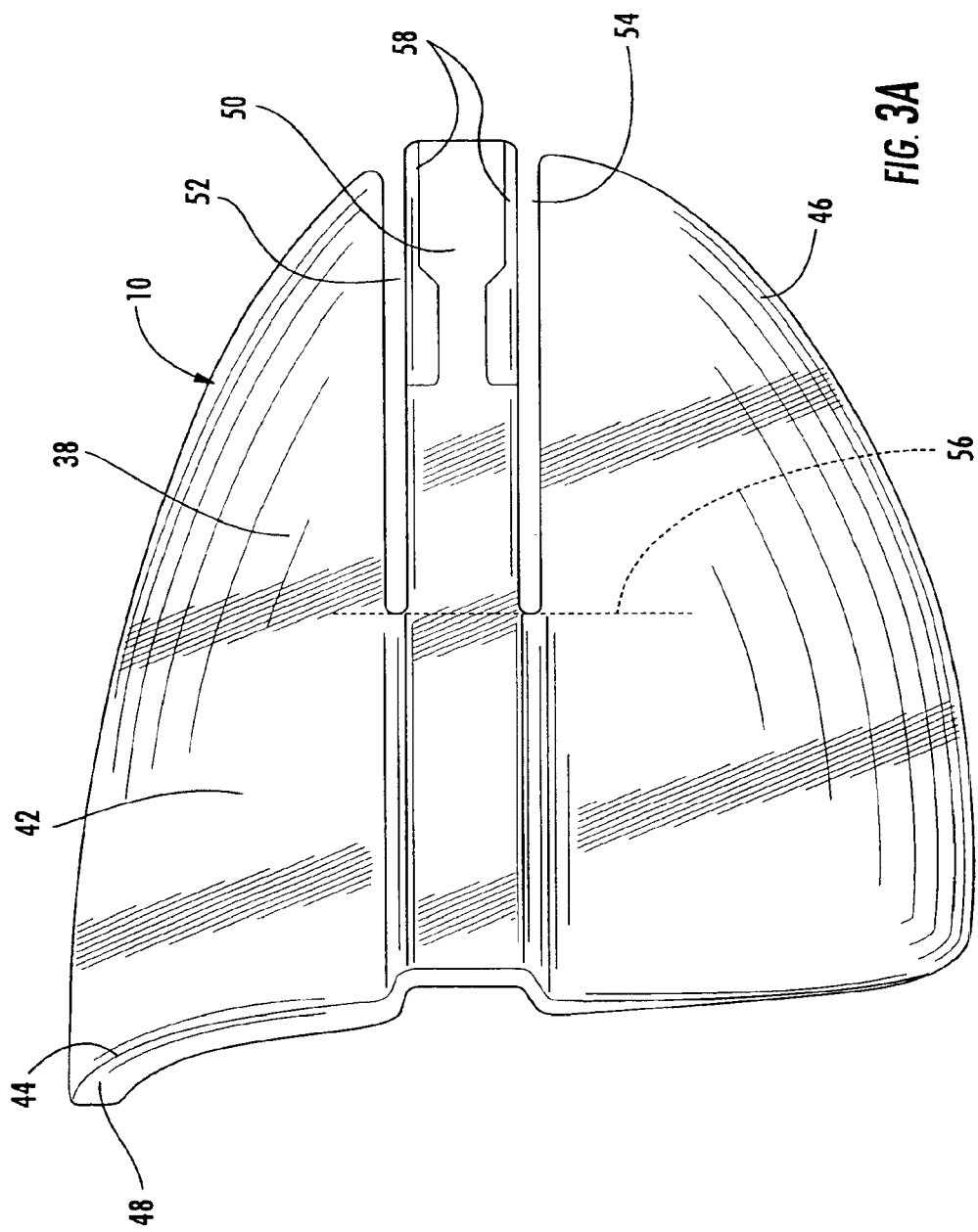
FIG. 3A is a side view showing the outside surface of the side shield.
Figure 3B:
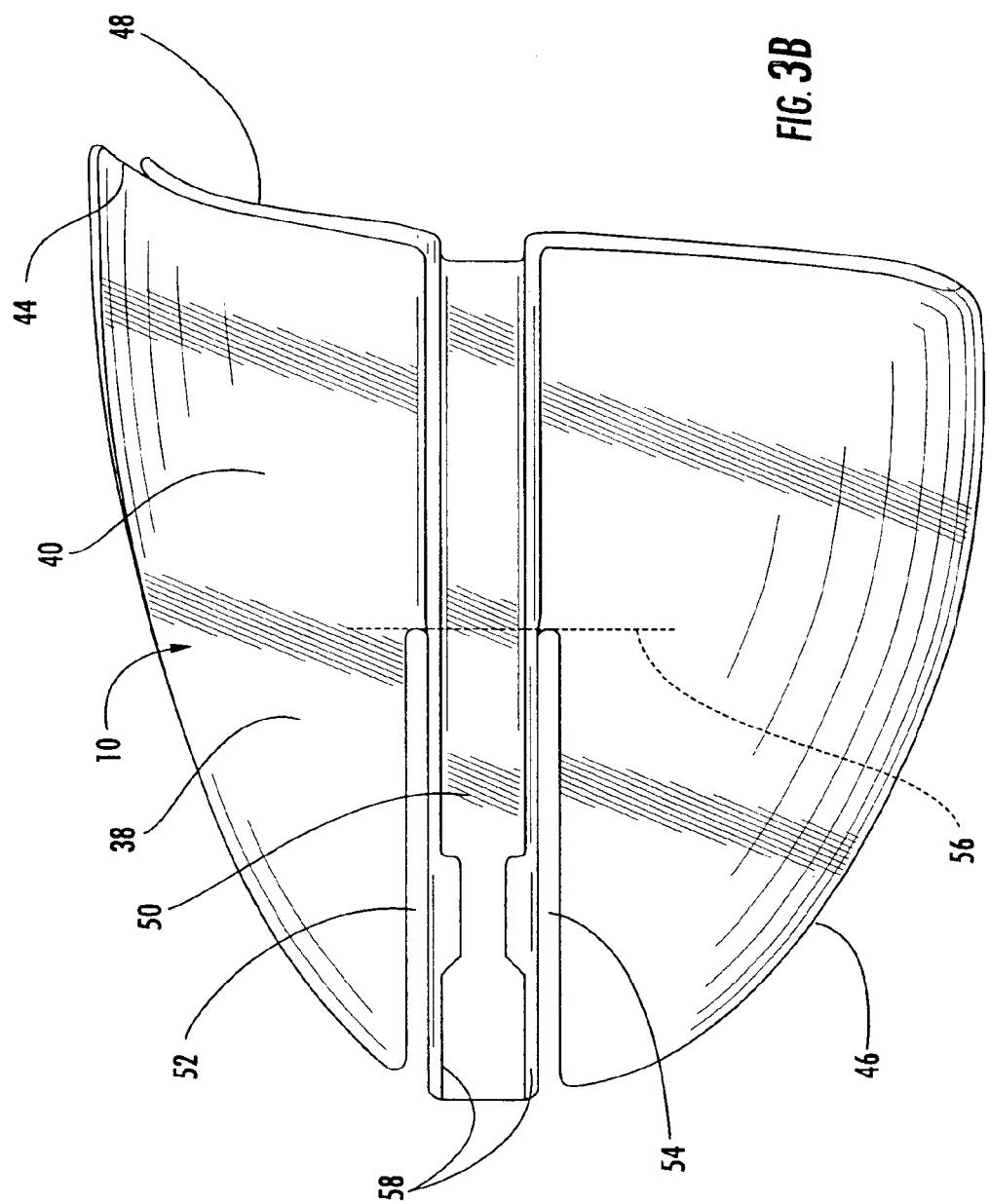
FIG. 3B is a side view showing the inside surface of the side shield, better illustrating the channel formations.
Figure 3C:
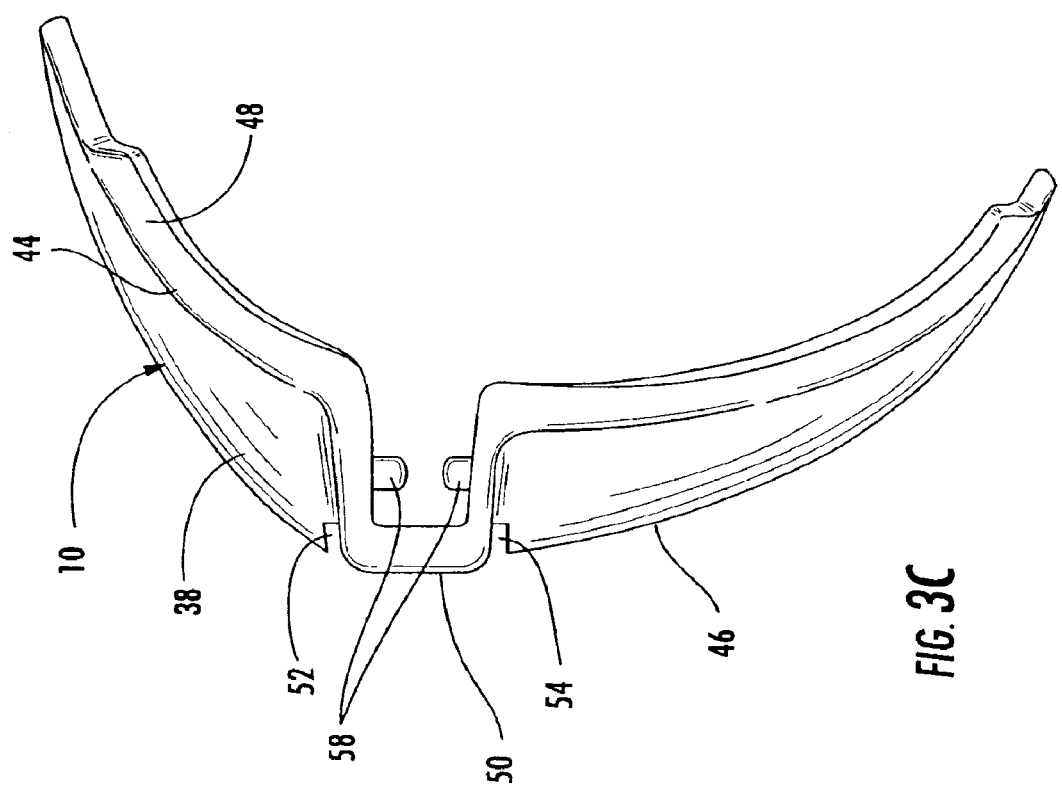
FIG. 3C is a front view of the side shield.
Figure 4:
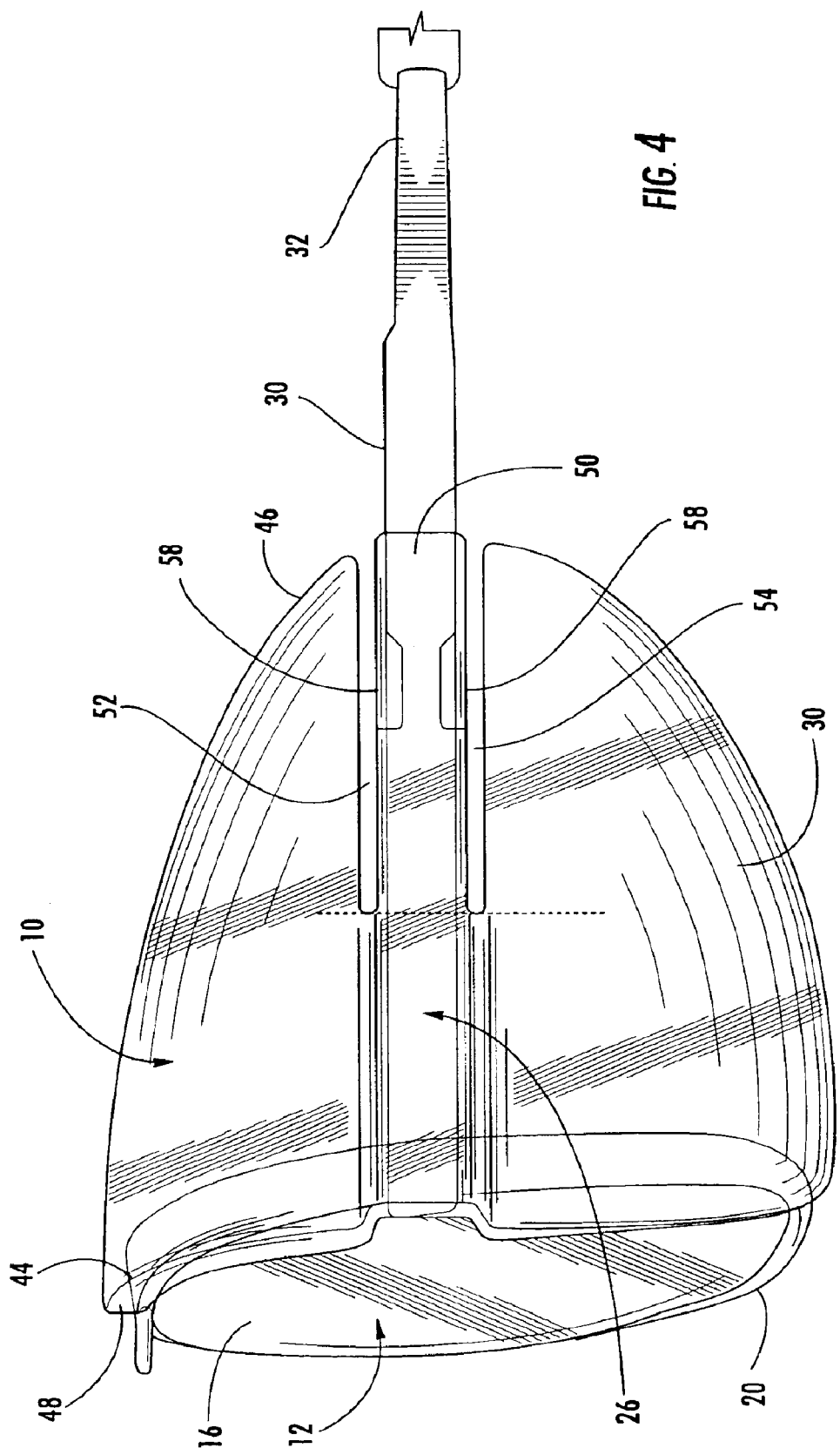
FIG. 4 is a side view of the side shield with the eyeglasses assembled.

Referring now to the drawings, a first embodiment of the novel side shield is illustrated and generally indicated at 10 in FIGS. 1–5. A second embodiment is illustrated and generally indicated at 100 in FIGS. 6–7. As will hereinafter be more fully described, the instant invention provides a relief structure in the side wall of a side shield which has been designed to allow a limited degree of outward deflection of the temple bar in eyeglasses having a spring-hinge temple bar.

The eyeglasses 12 comprise a frame generally indicated at 14, and lenses 16. The frame 14 as illustrated in the drawing figures is preferably constructed from a metallic material, although other materials, such as plastic, are also contemplated within the scope of the invention. The lenses 16 are preferably molded from a polycarbonate plastic material as commonly used in the safety industry. However, other plastic materials are also contemplated as well as glass lenses.

Turning back to the frame 14, the frame 14 includes left and right lens holders 20 configured and arranged to receive the lenses 16. The lens holders 20 are connected together by one or more bridge wires 24, or similar connecting structure that arcs over the nose of the wearer. The frame 14 further includes left and right temple bars 26 which respectively extend rearwardly from the temple edges of the left and right lens holders 20. As discussed hereinabove, the temple bars 26 are preferably a spring hinge construction wherein the temple bars 26 are permitted to flex outwardly to provide a more comfortable fit.

Figure 5A:
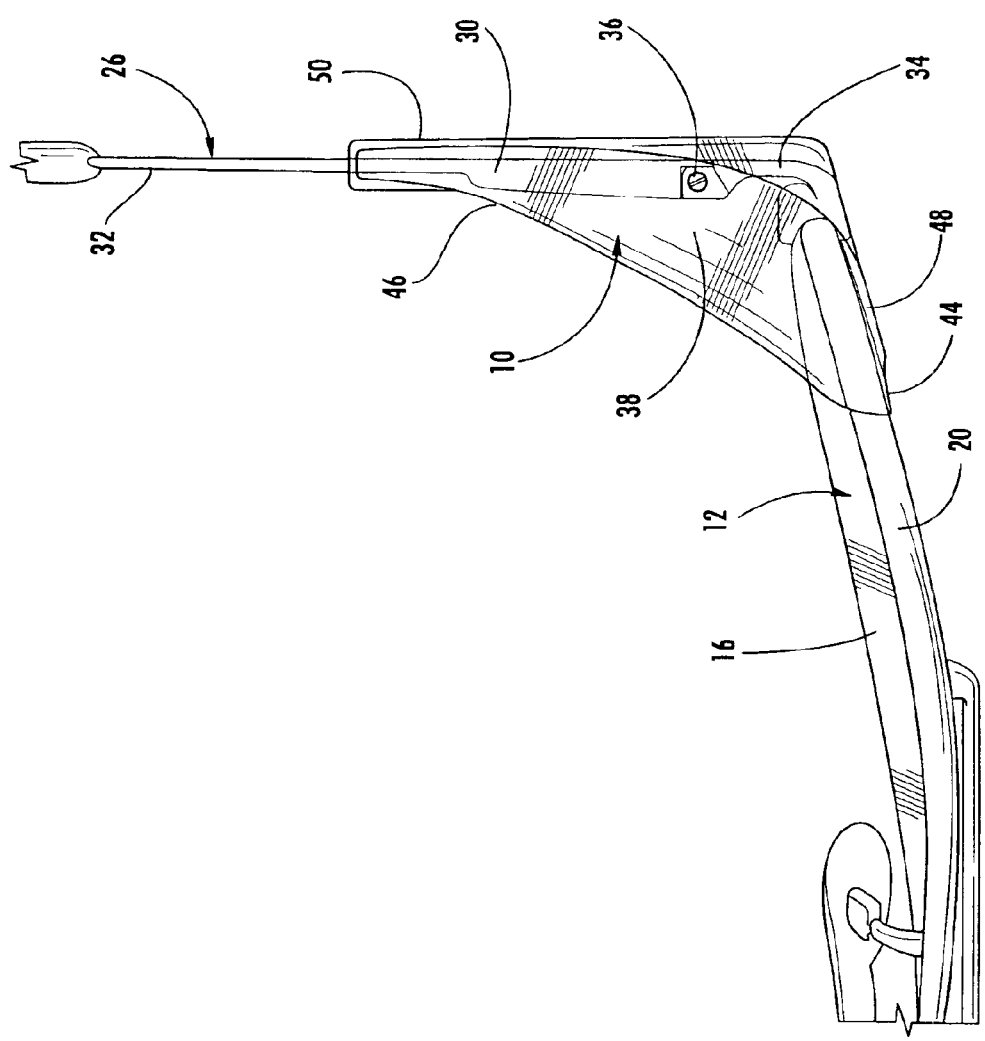
FIG. 5A is a top view of the side shield and eyeglasses in an outward operable position.
Figure 5B:
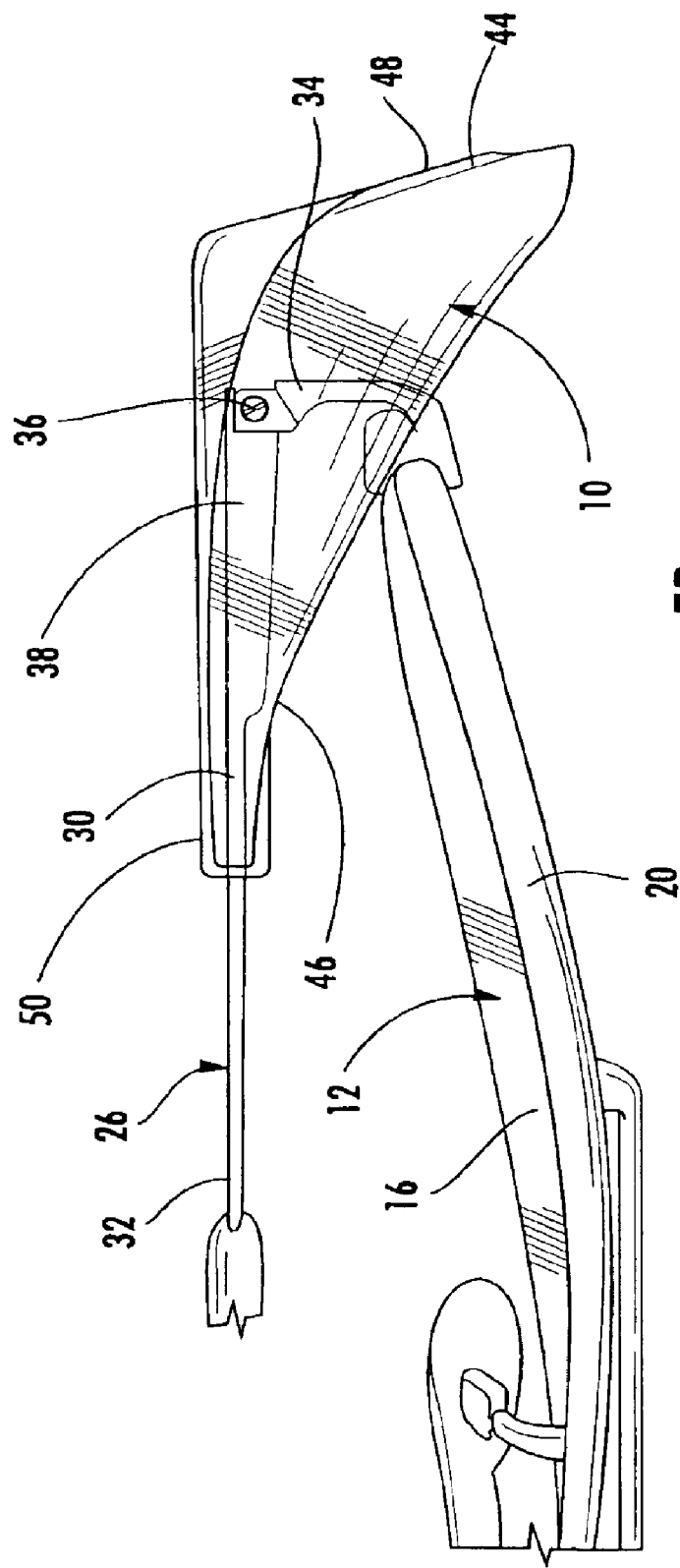
FIG. 5B is a top view of the side shield and eyeglasses in an inward folded position.
Figure 5C:
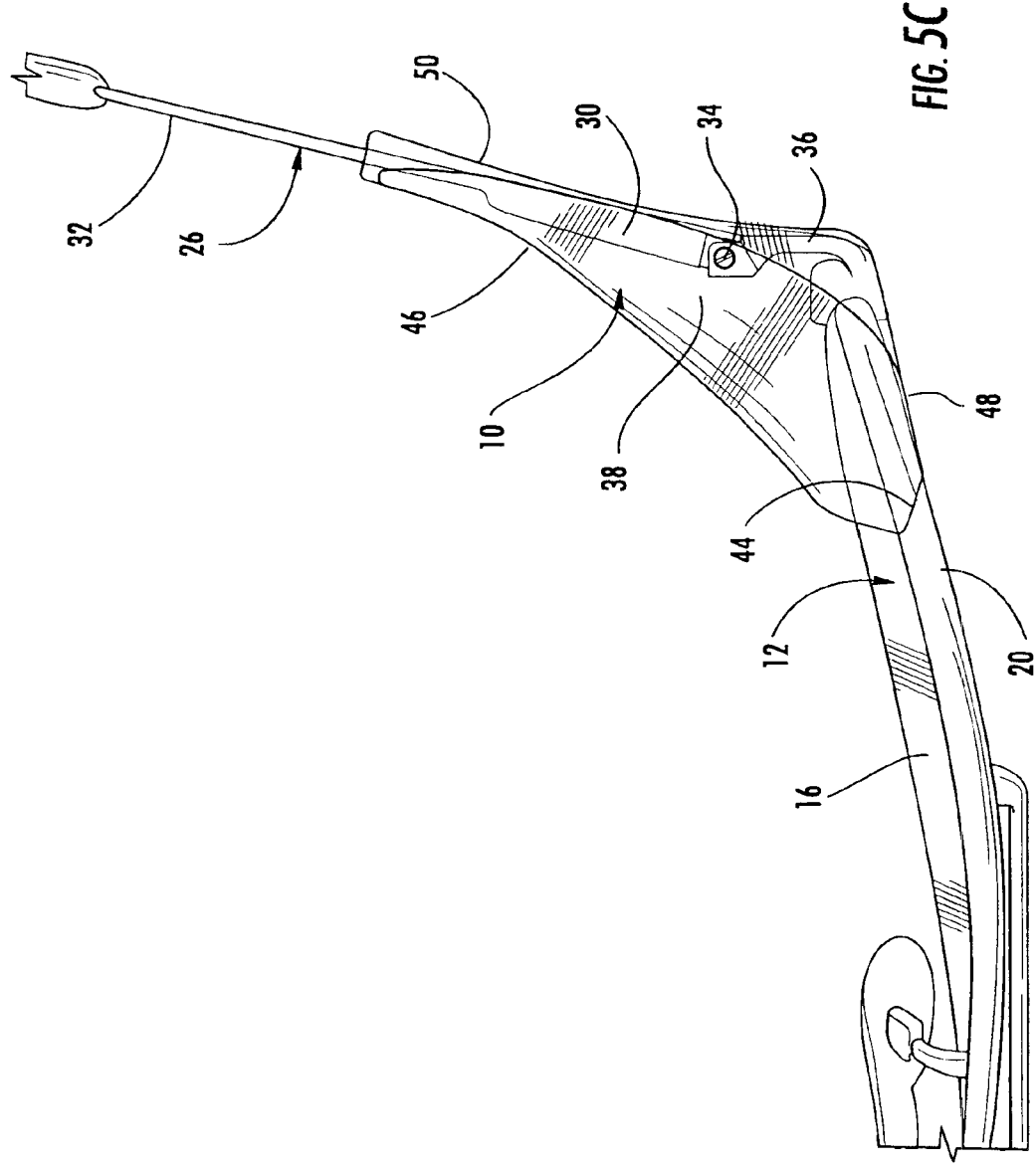
FIG. 5C is a top view of the side shield showing outward deflection of the temple bar and deflection of the flexible tab of the side shield.

In this regard, the temple bars 26 generally comprise a body portion 30 and a rearwardly extending cable portion 32. Optionally, a raised shoulder 27 can be located on the cable portion 32 and also near the hinge bracket 34 of the temple bars 26 to help retain an attached side shield 10. The front end of body portion 30 is connected to a hinge bracket 34 on the frame 14 by a conventional hinge structure 36 such that the temple bars 26 are hingeably movable between an inward folded position (see FIG. 5B) and an outward operable position (see FIG. 5A). The body portion 30 of the temple bars 26 includes an internal spring structure (not shown) that permits the temple bars 26 to flex further outward from the operable position (FIG. 5A) to a flexed position (FIG. 5C).

The spring structures are well known in the art, and the specific construction thereof is not critical to the invention with the exception that it must provide the functional flex described.

In a first embodiment, FIGS. 1–5, the side shield 10 is a unitary structure preferably molded from a transparent polycarbonate plastic, although other plastics, and other materials are also contemplated. For ease of description, only one of the side shields will be described in detail, it being understood that the opposite side shield is identical, only reversed in orientation.

The side shield 10 comprises an arcuate side wall 38 having an inwardly curved inner surface 40 and an outwardly curved outer surface 42. The side shield 10 is received in assembled relation with the eyeglasses 12 such that the inner surface thereof is received in facing relation with the outside surface of the temple bar 26, and further with a front edge 44 of the side wall 38 received adjacent to the lens holder 20 of the eyeglasses 12 and the rear edge 46 received mid-way along the length of the temple bar 26. A front edge 44 of the side shield 10 further includes an inwardly turned lip 48 which wraps around the front surface of the lens holder 20 of the frame 14 in the operative position. The front edge 44 and inward lip 48 are cooperatively formed to mate with the shape of the lens holders 20 so that a continuous barrier is formed around the outer edges of the eyeglasses 12. The inward lip 48 does not necessarily have to extend the entire length of the front edge 44, as can be seen at the top edge in FIG. 3B.

To provide a relief structure which will permit outward flex of the temple bar beyond the operative position, the side shield 10 is provided with an integrally formed flexible tab 50 defined by two slots 52, 54 extending forwardly from the rear edge 46 of the side shield 10 to a "hinge" or "flex" line 56 approximately mid-way between the rear and front edges 46, 44. The hinge line 56 is provided only as a reference point, and is not intended to define a physical structure. In the embodiment as illustrated, the thickness of the plastic at the hinge line 56 is consistent with the rest of the side wall 10 and does not specifically form a living hinge, but merely an imaginary line along which the tab can flex. However, it is contemplated that the plastic could be thinned along this hinge line 56 to in fact form a living hinge. Such an embodiment would also be within the intended scope of the invention.

The exact position of the hinge line 56 can also vary, but must be sufficiently forward from the rear edge 46 to permit movement of the terminal end of the flexible tab 50 relative to the side wall 10. The slots 52, 54 preferably extend parallel and adjacent to the upper and lower edges of the temple bar 26. However it is contemplated that the slots 52, 54 could converge or diverge from one another as well, forming a trapezoidal-shaped flexible tab 50 instead of a rectangular-shaped flexible tab 50 as shown. Such an embodiment would also be within the scope of the invention. The resulting flexible tab 50 is thus movable relative to the remainder of the side shield 10.

The side shield 10 is removably secured to the temple bar 26 by parallel channel formations 58 on the inside surface of the terminal end of the flexible tab 50. The rear cable portion 32 of the temple bar 26 is slidably received within the channel formed between the channel formations 58 to maintain the side shield 10 in assembled relation with the temple bar 26. The channel formations 58 are configured and arranged to form a tight friction fit around the peripheral surfaces of the rear cable portion 32 of the temple bar 26 and are intended to hold the side shield in fixed longitudinal position relative to the temple bar 26. Optionally, the temple bar can have a raised shoulder 27 located on the inside surface of the temple bar 26, which provides a backstop to the channel formations 58 to prevent the side shield 10 from rearwardly sliding down the temple bar 26.

Once assembled, the side shield 10 moves in unison with the temple bar 26 between the inward folded position and the outward operative position. (See FIGS. 5A and 5B). In the outward operative position, the front edge 44 of the side shield 10 mates with the outer edges of the frame 14 and forms a continuous barrier as described above. If needed, the flexible tab 50 allows the spring hinges of the temple bars 26 to flex further outwardly as they are intended to provide a more comfortable fit while also maintaining the proper positioning of the side shield 10. (See FIG. 5C).

In a second embodiment 100 (FIGS. 6–7), a large slot, greater than the width of the temple bar 126 extends forwardly from the rear edge 146 of the side wall 138 to provide a relief opening 150 in which the temple bar 126 can flex outwardly. A flexible spring clip 152, extending parallel to the temple bar 126 is mounted to the side wall 138 of the side shield 100 and extends rearwardly, filling the relief opening 150. The spring clip 152 is preferably made of metal, but could also be fashioned of plastic or other similar material. The spring clip 152 is attached by a fastener 154, such as a small screw or rivet, at its forward end adjacent to the front edge 144 of the side wall 138. The rear terminal end of the spring clip 152 includes channel formations 156 (shown in dotted line) forming a channel, similar to those in the first embodiment, into which the temple bar 126 is received to mount the side shield 100 to the eyeglasses 112. The spring clip 152 of the preferred embodiment comprises a thin strip of spring metal which is normally maintained within the vertical plane of the side wall 138 of the side shield 100, but which acts as a yielding leaf spring to allow outward deflection of the temple bars 126 when biased outwardly.

It can therefore be seen that the present invention provides a novel side shield wherein the side wall of the side shield is provided with a relief structure to permit outward movement of the temple bar without significant movement of the primary side shield structure. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A side shield for eyeglasses with a spring-hinge temple bar comprising:
   a side wall having a rear edge, front edge, and inside surface;
   a relief structure allowing outward deflection of the spring-hinge temple bar when biased outwardly without significantly displacing the side shield from its normal assembled position; and
   a fastening structure on said relief structure, the fastening structure securing the relief structure to the temple bar.

2. The side shield of claim 1 wherein the side shield is made of a rigid polycarbonate material.

3. The side shield of claim 1 wherein the side shield is made of a transparent plastic material.

4. The side shield of claim 1 wherein the relief structure is integrally connected to the side shield.

5. The side shield of claim 1 wherein the relief structure is detachable from the side shield.

6. The side shield of claim.1 wherein the side wall further comprises a inward lip depending from the front edge.

7. The side shield of claim 1 wherein the relief structure comprises:
   a flexible tab defined by two spaced slots extending forwardly from the rear edge of the side wall;
   said flexible tab having an inside surface and a terminal end, the flexible tab being movable relative to the side wall without significantly displacing the side shield from the eyeglasses; and
   wherein said fastening structure comprises channel formations on the inside surface and near the terminal end of the flexible tab forming a channel such that the spring-hinge temple bar may be received and secured within the channel.

8. The side shield of claim 1 wherein the relief structure comprises:
   two spaced edges extending forwardly from the rear edge of the side wall forming a relief opening large enough for the spring-hinge temple bar to pass through when biased outwardly;
   a spring clip having a forward end and a rear end;
   a fastening means connecting the forward end of the spring clip to the front edge of the shield wall;
   a fastening structure on the rear end of the spring clip to receive and hold the spring-hinge temple bar; and
   wherein the spring clip acts as a leaf spring to allow outward deflection of the spring-hinge temple bar when biased outwardly without significantly displacing the side shield from the eyeglasses.

9. The side shield of claim 8 wherein the fastening means is a small screw.

10. The side shield of claim 8 wherein the two spaced edges are parallel to one another.

11. A side shield for eyeglasses with a spring-hinge temple bar comprising:
    a side wall having an a rear edge, front edge, and inside surface;
    a flexible tab defined by two parallel slots extending forwardly from the rear edge of the side wall;
    said flexible tab having an inside surface and a terminal end, the flexible tab being movable relative to the side wall without significantly displacing the side shield from the eyeglasses; and
    a fastening structure on the inside surface and near the terminal end of the flexible tab forming channel formations such that the spring-hinge temple bar may be received and secured.

12. The side shield of claim 11 wherein the side shield is made of a rigid polycarbonate material.

13. The side shield of claim 11 wherein the side shield is made of a transparent plastic material.

14. A side shield for eyeglasses with a spring-hinge temple bar comprising:
    a side wall having a rear edge, front edge, and inside surface;
    two spaced edges extending forwardly from the rear edge of the side wall forming a relief opening large enough for the spring-hinge temple bar to pass through when biased outwardly;
    a spring clip having a forward end and a rear end;
    a fastening means connecting the forward end of the spring clip to the front edge of the shield wall;
    a fastening structure on the rear end of the spring clip to receive and hold the spring-hinge temple bar; and
    wherein the spring clip acts as a leaf spring to allow outward deflection of the spring-hinge temple bar when biased outwardly without significantly displacing the side shield from the eyeglasses.

15. The side shield of claim 14 wherein the fastening means is a small screw.

16. The side shield of claim 14 wherein the side shield is made of a rigid polycarbonate material.

17. The side shield of claim 14 wherein the side shield is made of a transparent plastic material.

* * * * *